US006954355B2

United States Patent
Gerstner et al.

(10) Patent No.: US 6,954,355 B2
(45) Date of Patent: Oct. 11, 2005

(54) PORTABLE COMPUTER-BASED DEVICE AND COMPUTER OPERATING METHOD

(75) Inventors: Robert Gerstner, Augsburg (DE); Diana Filimon, Gersthofen (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 10/609,875

(22) Filed: Jun. 30, 2003

(65) Prior Publication Data

US 2004/0004603 A1 Jan. 8, 2004

(30) Foreign Application Priority Data

Jun. 28, 2002 (DE) .......................................... 102 29 068

(51) Int. Cl.[7] .............................................. G06F 1/16
(52) U.S. Cl. ...................... 361/683; 455/127; 710/303
(58) Field of Search ................................ 361/679–687, 361/724–727; 455/89–90, 127, 269; 439/638; 710/303; 312/223.1–223.6

(56) References Cited

U.S. PATENT DOCUMENTS

| 5,307,297 | A | | 4/1994 | Iguchi et al. |
| 5,628,055 | A | * | 5/1997 | Stein ........................ 455/575.1 |
| 6,646,866 | B2 | * | 11/2003 | Kao ............................ 361/683 |
| 6,697,251 | B1 | * | 2/2004 | Aisenberg ..................... 361/683 |
| 6,795,304 | B1 | * | 9/2004 | Lam ............................ 361/683 |
| 2002/0008693 | A1 | | 1/2002 | Banerjee et al. |

FOREIGN PATENT DOCUMENTS

| DE | 197 16 486 A1 | 9/1998 |
| EP | 0 626 635 A2 | 11/1994 |
| GB | 2 303 945 A | 3/1997 |
| WO | 00/79372 A1 | 12/2000 |
| WO | 02/09023 A1 | 1/2002 |
| WO | 02/42857 A2 | 5/2002 |

OTHER PUBLICATIONS

Author not listed: "Sony–PDA Clie T425 kommt im Februar nach Deutschland" [Sony–PDA Clie T425 is coming to Germany in Feb.], http://www.golem.de/0201/17866.html, Jan. 21, 2003, four pages.

* cited by examiner

Primary Examiner—Hung Van Duong
(74) Attorney, Agent, or Firm—Laurence A. Greenberg; Werner H. Stemer; Ralph E. Locher

(57) ABSTRACT

A portable computer-based device, for example a PDA, a cell phone, or a notebook, may be used as an operator control element for second computer-based devices. The portable computer-based device is enabled to emulate mouse and keyboard inputs the second device and to transfer them to the second computer-based device which is to be remote-controlled.

15 Claims, 1 Drawing Sheet

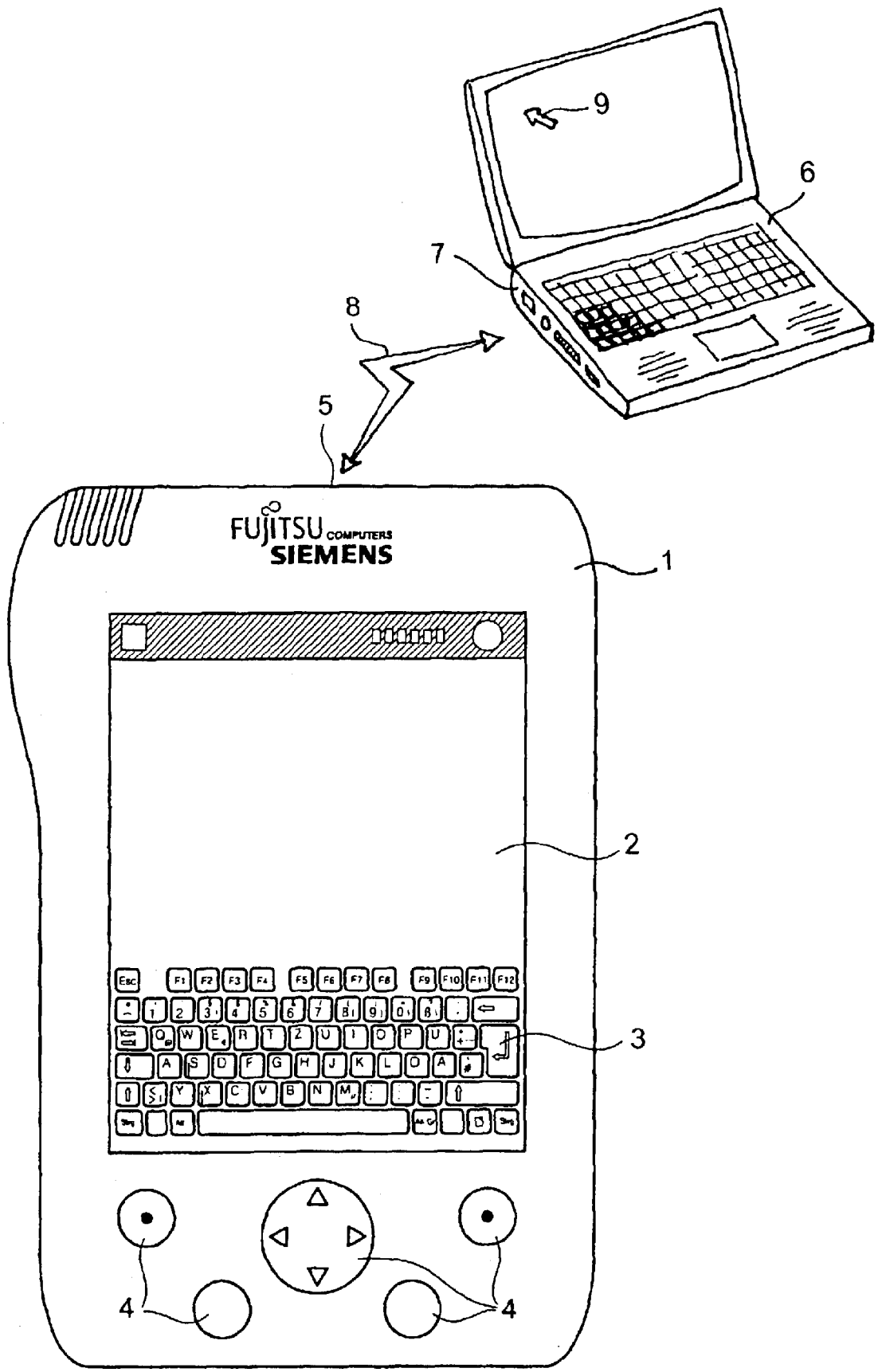

PORTABLE COMPUTER-BASED DEVICE AND COMPUTER OPERATING METHOD

BACKGROUND OF THE INVENTION

Field of the Invention

The invention relates to a portable computer-based device.

Portable computer-based devices such as PDAs (personal digital assistants)., cell phones, or notebooks (portable computers) are becoming more and more popular owing to their compact design. In addition, the devices have radio and IR interfaces which are suitable for transmitting data. These devices are always in range of a user owing to their inherent function.

Nevertheless, the field of use of these devices is limited. This is clearly opposed to the often very high purchase price for these devices. It is therefore desirable to expand the possible ways in which such expensive portable and computer-based devices can be used.

Applications that expand the original purpose of use of PDAs in such a way that these devices can be used as versatile remote controls for electronic entertainment devices such as TV sets or Hifi devices are known for portable computer-based devices such as PDAs, for example. Applications of these devices as operator control elements or input devices for computer-based devices are not known. Essential operator control elements of these second computer-based devices are, for example, a mouse and/or keyboard, the applications of the computer being fed with data and operated. Alternatively, such input devices are also known as wirefree or cordless devices that are connected to the second computer-based device via a radio link or infrared link.

SUMMARY OF THE INVENTION

It is accordingly an object of the invention to provide a portable computer-based device, which overcomes the above-mentioned disadvantages of the heretofore-known devices and methods of this general type and improves the above-outlined situation.

With the foregoing and other objects in view there is provided, in accordance with the invention, a portable computer-based device (e.g., PDA, notebook, cell phone), comprising:

at least one input element; and
an interface for communicating with a second computer-based device for establishing the portable computer-based device as an operator control element for the second computer-based device and for establishing the portable computer-based device as an input device for the second computer-based device.

With the above and other objects in view there is also provided, in accordance with the invention, an input method or a remote control method, comprising:

providing a portable computer-based device having an input element and a communications interface;
establishing a communications connection between said portable computer-based device and a second computer-based device; and
using the portable computer-based device as an input device for the second computer-based device.

Here, portable computer-based devices such as PDAs, cell phones or notebooks can be used as an operator control element for second computer-based devices. A portable computer-based device according to the invention is capable of emulating mouse inputs and keyboard inputs for a different device and transferring them to the remote-controlling, second computer-based device. The advantages of such a portable computer-based device can be summarized as follows:

A plurality of second computer-based devices can be actuated by using standard transmission paths.

Existing hardware such as PDAs, cell phones or notebooks constitute, by virtue of the additional functions, an alternative to the otherwise customary or necessary additional devices as operator control elements.

Device-specific input devices of the second computer-based devices can be replaced.

A plurality of wireless connection possibilities, for example WLAN, IR, Bluetooth, for connecting to the second computer-based device to be controlled can be used.

Complex operator control steps, for example button combinations or button input sequences, can be combined and then called and transferred by a simple action such as, for example, pressing a button or an abbreviation.

Advantageous embodiments of the portable computer-based device are, for example, a PDA, cell phone or notebook with infrared connection to a second computer-based device. This portable computer-based device opens up a wide variety of operator control possibilities for the second computer-based device. For example, key combinations for emulating complex chains of commands and complete macros can be generated by means of the pop-up keyboard which is presented on the display of the PDA. Furthermore, the touch screen of the PDA can be used as a touchpad for the second computer-based device. Likewise, special mouse movements or positioning of the mouse can be brought about by means of software or by pushing buttons. This includes, for example, the positioning of the mouse or of the cursor in one of the corners of the screen or display or the positioning of the mouse or of the cursor in the center of the screen or display, or in the center of one of the screen or display pages. Furthermore, keyboard commands which are used frequently can be generated rapidly.

When the data transmission between the PDA, cell phone or notebook is expanded to a bidirectional data traffic, it being possible to transmit data back from the device to be remote-controlled to the remote-controlling device, further versatile application variants are obtained, for example information or status displays of the remote-controlled device on the portable or remote-controlling device.

The computer-based device according to the invention is capable of using various radio protocols, for example Bluetooth or WLAN or a radio/wire combination with a suitable additional device with USB, to maintain contact with the second computer-based device which is to be remote controlled. Alternatively, the portable computer-based device can also be connected to the second computer-based device via a wire-bound connecting link, for example a USB.

According to one advantageous development of the computer-based device, it is possible to use a notebook for remote controlling a second computer-based device. This permits remote inputs to be made via the notebook keyboard and notebook mouse.

The possibility of an inventive development of a computer-based device, for example a cell phone, is also very advantageous, it being possible to use this development to emulate a mouse function for menu operator control of a TV device.

Other features which are considered as characteristic for the invention are set forth in the appended claims.

Although the invention is illustrated and described herein as embodied in a portable computer-based device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE is a plan view onto a PDA according to the invention, forming an exemplary embodiment of a portable computer-based device, and a perspective view of a remote-controlled laptop computer.

DESCRIPTION OF THE PREFERRED EMBODIMENTS

Referring now to the sole FIGURE of the drawing in detail, the PDA (personal digital assistant) 1 according to the invention has an interface 5. The interface 5 may be alternatively embodied as a radio interface or an infrared interface. In the case of a radio interface, the same corresponds to the protocols of Bluetooth or WLAN, for example.

Furthermore, the PDA 1 has a touch screen or touchpad 2 which preferably serves an input element for mouse positioning for the second computer-based device.

Furthermore, the PDA 1 has, at the lower end 3 of the touch screen, a representation of an entire keyboard, here an international "querty" keyboard with a letter arrangement for German language. The characters of the keyboard can be selected by touching them with a pointed object and they can be independently transferred by the PDA 1 to the second computer-based device.

The PDA 1 can be used to operate a second computer-based device 6. The device 6—a standard notebook computer in the exemplary drawing—has a variety of ports 7, namely an IR port (infra-red), a radio link port, a serial port, a USB and firewire port, and the like. Accordingly, any of a variety of communications links may be set up at a connection 8 which may be according to the protocol Bluetooth, or WLAN, or radio/wire combination with a suitable additional device with USB, and the like. The PDA 1 can establish a connection with the computer 6 to operationally control the same and to emulate/replace the computer keyboard, the mouse pointer, etc.

The PDA 1 has mouse positioning buttons 4 which permit rapid movement of the mouse pointer 9 on the remote-controlled second computer-based device 6 into entirely predetermined positions, for example top left, top right, bottom left, bottom right or center of the screen, or else also into other predetermined positions.

In the first instance, the application for computer-based devices such as PDAs, cell phones, or notebooks has been described above. It is possible to use these to operate a second computer-based device such as PCs or the like. The invention is however not tied solely to these exemplary embodiments. Rather, it is clearly apparent that the basic concepts of the invention can be applied to further combinations of computer-based or processor-based devices.

We claim:

1. A portable computer-based device, comprising:
   at least one input element; and
   an interface for communicating with a second computer-based device for establishing the portable computer-based device as an operator control element for the second computer-based device and for establishing the portable computer-based device as an input device for the second computer-based device, said interface forming part of a radio link for transmitting data between the portable computer-based device and the second computer-based device.

2. The portable computer-based device according to claim 1 configured as a PDA, a cell phone, or a notebook computer.

3. The portable computer-based device according to claim 1 for emulating at least one of a mouse and a keyboard of the second computer-based device.

4. The portable computer-based device according to claim 1, wherein said radio link is implemented according to a protocol selected from the group consisting of Bluetooth, WLAN, and GSM/GPRS.

5. The portable computer-based device according to claim 1, wherein said at least one input element includes a touch screen for use as a remote touchpad.

6. The portable computer-based device according to claim 1, wherein said at least one input element includes predetermined buttons for at least one of moving and positioning a mouse pointer on the second computer-based device.

7. The portable computer-based device according to claim 1, wherein said at least one input element includes predetermined buttons for carrying out keyboard input sequences of the second computer-based device.

8. The portable computer-based device according to claim 1, wherein said interface forms a part of a bidirectional data transmission path between the portable computer-based device and the second computer-based device.

9. An input method, comprising:
   providing a portable computer-based device having an input element and a communications interface;
   establishing a communications connection between said portable computer-based device and a second computer-based device;
   using the portable computer-based device as an input device for the second computer-based device; and
   establishing a radio link for transmitting data between the portable computer-based device and the second computer-based device.

10. The method according to claim 9, wherein the portable computer-based device is a PDA, a cell phone, or a notebook computer and the input device emulates at least one of a mouse and a keyboard for the second computer-based device.

11. The method according to claim 9, wherein the radio link is implemented according to Bluetooth, WLAN, or GSM/GPRS protocols.

12. The method according to claim 9, which comprises using a touch screen of the portable computer-based device as a remote touchpad for the second computer-based device.

13. The method according to claim 9, which comprises moving or positioning a mouse pointer on the second computer-based device via predetermined buttons of the portable computer-based device.

14. The method according to claim 9, which comprises inputting keyboard input sequences to the second computer-based device via predetermined buttons on the portable computer-based device.

15. The method according to claim 9, which comprises establishing bidirectional data transmission paths between the portable computer-based device and the second computer-based device.

* * * * *